Figure 1:
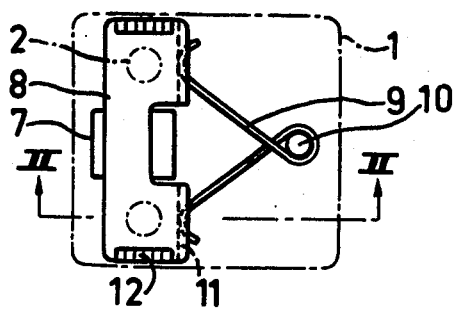

United States Patent

[11] 3,601,758

[72] Inventor Tage Arnold Davidsson
 Gothenburg, Sweden
[21] Appl. No. 831,490
[22] Filed June 9, 1969
[45] Patented Aug. 24, 1971
[73] Assignee Joel Olssons Elektriska AB
 Stockholm, Sweden
[32] Priority June 10, 1968, Mar. 31, 1969
[33] Sweden
[31] 7767/68 and 4500/69

[54] BIPOLAR ELECTRIC SOCKET
 10 Claims, 7 Drawing Figs.
[52] U.S. Cl. .................................................. 339/40,
 339/36
[51] Int. Cl. ...................................................... H01r 13/44,
 H01r 13/60
[50] Field of Search ........................................... 339/36, 37,
 40; 70/423, 424, 427, 455

[56] References Cited
 UNITED STATES PATENTS
 2,770,786 11/1956 Chelton ........................ 339/40

FOREIGN PATENTS
1,448,863 7/1966 France ......................... 339/40
 700,473 12/1953 Great Britain ................. 339/40

Primary Examiner—Marvin A. Champion
Assistant Examiner—Terrell P. Lewis
Attorney—Max Wall ABSTRACT: A bipolar electric socket of the type having, for protectional reasons, a spring-loaded shutter mounted in the space between the entrance holes and the underlying contact sleeves in such a manner that the shutter will be pressed away to uncover the sleeves only when two pins or the like—corresponding to the plug pins—are inserted simultaneously in said holes. One end of the shutter is freely supported by an upwards-sloping surface terminating beyond the holes, and the other end is spring loaded to maintain the shutter pressed against the underside of the holes and in engagement with a blocking shoulder. The insertion of the two pins of an attachment plug will first release the shutter from the shoulder and then push the shutter down the sloping surface, against the spring action, to uncover the entrance holes and the sleeves.

PATENTED AUG 24 1971 3,601,758

SHEET 1 OF 2

Inventor:
Tage Arnold Davidsson

Max Wall
Attorney

BIPOLAR ELECTRIC SOCKET

This invention relates to an electric bipolar socket comprising a protective shutter inserted between the front plate and the plane which is defined by the mouths of the contact sleeve located therebelow, said shutter being adapted by action of a directing force to shield the sleeve mouths from the two lead-in holes of the front plate. Upon a simultaneous insertion of both pins of an attachment into the socket, the shutter is moved to expose the contact sleeves so that the connection of the plug and socket is rendered possible.

An ideal socket of the aforesaid type is desired to meet the following requirements:

a. Simple and robust construction, operating satisfactorily even when successively subjected to wear.

b. Highest possible safety against improper action by children, by not inviting "poking," and by its stability which prevents a breakthrough by violence of the protective covering surfaces.

c. Simple and easy operation —i.e. insertion of the plug — independent of the dimensions of the plug pins, especially of the pin ends.

d. Dirt-, dust- and water-repellent design by sealed lead-in holes when the socket is not in operation.

Latterly a great number of different constructions for sockets have been made which are safe against misuse by children (i.e. protected against single-pole insertion of narrow metal objects). Of those constructions, many satisfy one or several of the aforementioned conditions a–D but not all of the conditions simultaneously.

The majority of the "child-safe" sockets is based on an oblique bevelling of the end edge of the shutter (or shutters), in such a way, that the resulting inclined surface faces upwards to the lead-in holes of the socket front plate, so that plug pins simultaneously inserted therein release a locking means and by sliding against respective inclined surfaces press aside the shutter (shutters) for exposing the contact sleeve mouths. Due to the fact that the transition of the inclined plane to the bottom plane of the shutter defines a relatively sharp and thereby weak or brittle edge, this edge is rapidly deformed or destroyed by frequent use whereby the function of the socket is deteriorated, rendered more difficult or impossible. This is adverse to the requirement under (a).

Furthermore, it will not be very difficult for a child to wedge in a pointed metal object, such as a nail, against the edge and destroy it by prying—especially if the socket has been in use for some time and worn. This is adverse to the requirements under (b).

In order to operate this shutter system of wedge type fairly easily—i.e. without having to apply much more force for inserting the plug than at a usual unprotected socket—the surfaces on the shutter ends very often have to be given such a heavy inclination, that the minimum distance according to the CEE standards between the upper surface of the socket and the sleeve mouth cannot be kept any longer. To become in this case subject to an exemption from the standards cannot be regarded compatible with the requirement under (c). This requirement is not met, either, by the constructions which more or less presuppose a certain definite plug pin diameter or form of the pin and proper, and it is still less met by the constructions which require the plug to be operated by two movements in different directions, viz. the plug has first to be moved or turned for removing a separate covering plate before the plug can be inserted in the direction of the pins. Heretofore, finally, only very few sockets have been presented which are intended for indoors use, at which the lead-in holes in nonoperative state of the socket are totally blocked, which is a prerequisite condition for satisfying the requirement under (d). Moreover, the appearance which in this case is very "uninteresting" for children—no downwardly inclined surface in the holes nor wedge points projecting upwardly in the same—is favorable for the requirements under (b).

All of the aforementioned requirements a–d are in an exemplary way satisfied by the socket according to the invention which is characterized by the combination that the shutter is adapted by action of a spring means to be pressed to a nonoperative position shielding the holes by sliding with its lower edge against an upwardly inclined guide surface within of the socket, that the slope of the guide surface continues so far in relation to the holes that the plane upper surface at least of the front portion of the shutter in nonoperative position is pressed into tight abutment to the entire edge circumference of the holes, and that the two plug pins upon their simultaneous insertion first by pressure against the action of the spring means release the shutter from its fixed locking edges within the socket, which edges are active in nonoperative position of the shutter, and thereafter cause the shutter to slide downwards along the guide surface for exposing the sleeve mouths located therebelow.

Figure 2:
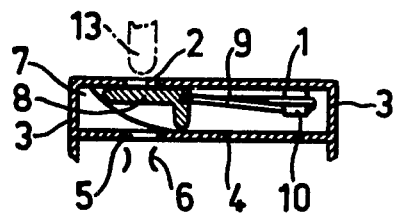
Figure 3:
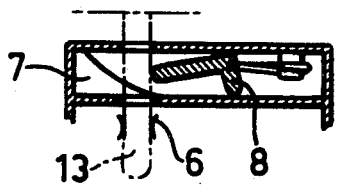
Figure 4:
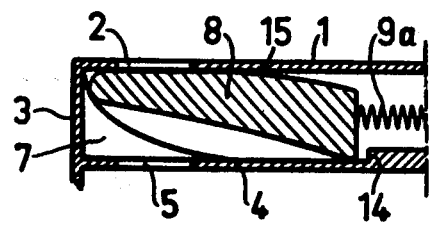
Figure 5:
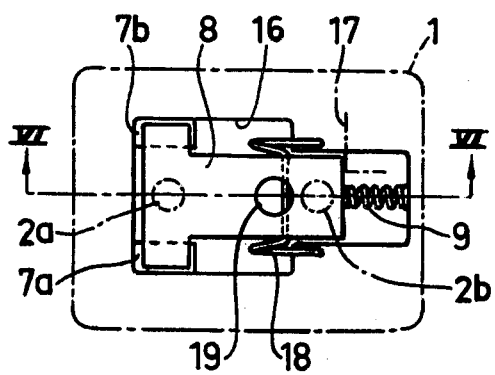
Figure 6:
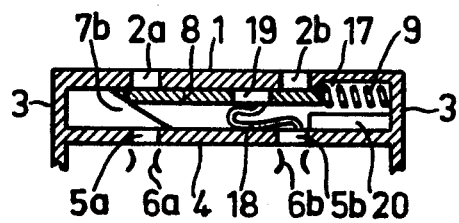
Figure 7:
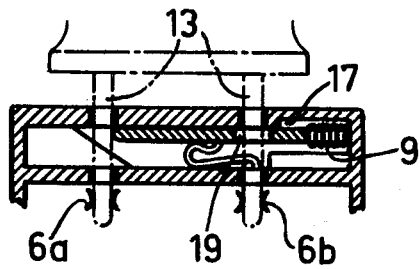

The invention is described in greater detail in the following, with reference to accompanying drawings, where FIG. 1 is in a very schematic way shows an illustrating embodiment of the socket according to the invention, FIG. 2 and 3 show sections along the line II in FIG. 1 for the upper portion of the socket in nonoperative and operative position, respectively, FIG. 4 on a larger scale shows a section through a part of another embodiment according to the principles of the invention, FIG. 5 shows a horizontal view of a third embodiment of the socket according to the invention, and FIGS. 6 and 7 show sections along the line VI in FIG. 5 for the nonoperative and operative position, respectively, of the socket.

The embodiment according to FIGS. 1–3 will be explained first. The front plate 1 (dash-dotted line in FIG. 1) of the socket is provided with usual pin lead-in holes 2. In this case the front plate is united by wall portions 3 with a "bottom" 4 which includes holes 5 located directly in front of the lead-in holes 2, which holes downwardly open above the conducting sleeves 6, which are merely indicated. Within the plane parallel gap between the front plate 1 and the bottom 4 the locking mechanism according to the invention is located which comprises two main parts whereof one is stationary and the other movable. The stationary main part is a wedge 7 extending from the end wall 3 on the left in the Figure, which wedge slopes downwards to the bottom 4 and extends centrally between the lead-in holes 2. The movable main part is a shutter 8 which is shown to have L-shaped cross section (but as well may have a purely rectangular or wedge-shaped cross section), with the only requirement that the upper surface of the shutter is plane at least at its front portion. The rear side of the shutter is engaged by a rocker spring 9 which is secured about a pin 10 mounted on the lower surface of the front plate and by the curved ends of its legs slidingly engages in respective grooves 11 in the rear edge of the shutter. The shutter is provided at its ends with upwardly facing notches or grooves 12 for cooperation with opposite rooves (not shown) in the lower surface of the front plate.

The function of the aforedescribed socket will now be explained with reference to FIGS. 2 and 3.

In FIG. 2 showing the "resting postion" of the socket the spring 9 presses the shutter 8 forwardly upwards on the slightly inwardly bulged surface of the wedge 7, so that the plane upper surface of the shutter is caused tightly to abut to the lower edges of the lead-in holes 2. In this position the socket is sealed dust and water tight, and the two low and plane depressions visible from the outside of the socket do not arouse interested curiosity of children. However, if this would be the case, and children would insert, for example, a nail, knitting needle or like metal object into one of the holes 2, the shutter 8 is rocked into groove engagement on one side, so that a sliding motion of the shutter downwards along the wedge 7 cannot take place. It needs the insertion of two long and narrow objects, i.e. in practice the pins 13 of a plug, so to balance he shutter that it operates free of groove engagement and is forced to slide with its lower front edge downwards along the upper surface or guide surface of the wedge 7 against the action of the spring 9 until the bottom holes 5 have been exposed and the pins 13 freely can pass into the respective contact sleeves 6. This state is shown in FIG. 3. It was found by experiments that by a suitable balance between the spring force and the extension of the guide surface of the wedge 7, the removal of the shutter does not offer an appreciable resistance to the insertion of a plug. As soon as the plug is pulled out, the shutter is returned by action of the spring to he position in which it abuts to the entire circumference of the lower edge of the lead-in holes 2 as shown in FIG. 2.

The construction by its compact and strong dimensioning ensures a long life. A further feature contributing to a still longer life is the possibility of manufacturing the shutter of thermosetting resin which without further action stands the heat tests recommended by CEE, without deteriorating the strength.

As regards locking means for preventing one-pole insertion of narrow objects through the holes in the front plate, there exist a great number of other different possibilities whereof one is shown in FIG. 4 in which the details corresponding to FIGS. 1–3 are given the same reference numerals. In this embodiment a compression spring 9a acts upon the rear edge of the shutter 8 and pressed (in nonoperative position of the socket) the shutter upwards along the central wedge 7 into abutment to the lower edge of the lead-in holes 2. The shutter in this embodiment is shown to have fingerlike cross section, and it has no grooved end edges for engagement with opposite grooves in the lower surface of the front plate 1. The locking engagement against one-pole insertion, instead, is moved to the bottom 4 and given the form of a stop 14 for cooperation with the lower rear edge of the shutter. When an object is inserted single-pole into a hole 2, the shutter is pressed against the action of the spring 9a somewhat rearwards while simultaneously rocking about the longitudinal axis of the wedge 7, so that the rear end of the shutter at one end is stopped by the stop 14 whereby a continued rearward movement of the shutter is made impossible. Upon insertion of the two pins of a plug the shutter 8 is moved back as before, but now the shutter simultaneously swings slightly upwards about the mounting point 15 on the inside of the front plate 1, so that upon continued insertion of the pins the lower rear edge of the shutter passes past the stop 14.

FIGS. 5–7 show an embodiment with resilient support of the rear edge or end edge of the shutter.

The effect achieved thereby is first the effective sealing of the lead-in holes against dirt, dust and water in nonoperative state of the socket. This can be achieved without having simultaneously to overcome a relatively strong resistance for removing the shutter. In the according to FIGS. 1–4 the sealing effect is in direct relation to the wedge-in pressure applied by the return spring 9 and 9a on the shutter between the inclined guide surface and the lower surface on the front plate.

In the front plate 1 indicated by dash-dotted lines in FIG. 5 the lead-in holes for the pins are designated by 2a and 2b (see also FIG. 6). A space is provided in the socket between the front plate and side portions 3 and bottom 4. Within said bottom, directly in line with lead-in holes 2a and 2b, bottom openings 5a and 5b, respectively, which are aligned with contact sleeves 6a and 6b, respectively. Between the front plate 1 and the basement bottom 4 is mounted a shutter 8 which in this embodiment has a plane T-shape in plan view and is adapted to move in the direction defined by the connecting line between the lead-in holes 2a and 2b. The movement is guided by spaced edge contact surface 16 within the body of the socket, one at each side of the horizontal T-beam of the shutter. The ends of said T-beam are adapted to cooperate each with its underlying guide surface or wedges 7a and 7b, respectively, which project upwardly from the bottom 4 and are inclined in the direction from the hole 2a to the hole 2b. In nonoperative position of the shutter shown in FIGS. 5 and 6, where the shutter is pushed on the wedges, the shutter end opposite to the T-beam, i.e. the stem portion of the T, lies adjacent a pair of opposite stop members 17 formed on the bottom face of the front plate 1. The shutter is urged against the wedges by a helical compression spring 9 laid in between the stem end of the shutter and the wall 3, and acting in the plane of the shutter. In order to maintain the plane upper surface of the shutter, in nonoperative position, in tight abutment with the edge circumference of the lead-in holes 2a, 2b and simultaneously in a safe engagement with stop member 17, a retaining spring 18 is placed between the shutter 8 and the bottom 4. In view of the fact that the shutter 8 also must have a recess 19 (which in the embodiment shown is a circular opening) located in the line of symmetry of the shutter and in nonoperative position adjacent to the lead-in hole 2b, the retaining spring—for safely avoiding any interference with the recess 19—is made in the shape of a yoke its curved legs being fastened in the bottom 4 each on its side of the shutter stem, as shown in the drawings. By this design the retaining spring also is given a force component increasing the effect of the compression spring 9.

When trying to insert, for example, a nail or other long and narrow metal object only into one lead-in hole, say hole 2a, the shutter 8 remains rigid in the nonoperative position shown in FIGS. 5 and 6, shielding the bottom openings 5a, 5b and thereby the underlying contact sleeves 6a, 6b are shielded, because the retaining spring 18 keeps the shutter pressed engagement with the stop means 17. Upon insertion of an object only in the other lead-in hole 2b, the shutter 8 slightly springs down against the action of the retaining spring 18 (a stop surface limiting the downward springing is represented in FIG. 6 by a stop 20), so that the stem end of the shutter free from the stops 17, but a displacement of the shutter apparently cannot be effected by this operation. Only when two long and narrow objects—in reality the two plug pins 13—are inserted simultaneously into the two holes 2a, 2b, then at first the locking engagement of the shutter with the edge 17 is released and thereafter the shutter is moved to the final open position shown in FIG. 7. In this position the plug pins 13 reach at the contact sleeves 6a, 6b by passing outside of the rear edge of the shutter and, respectively, through the recess 19 of the shutter. Owing to the fact that the embodiment shown is not based on any lateral rocking of the shutter, but that the shutter upon its actuation performs a stable sliding motion, freedom of play without risk of locking obtained at the same time as he plug pins can be inserted smoothly.

If one desires to prevent the highly improbable case that a child, after so having inserted a very sharply pointed object into the hole 2b that the shutter is free of the edge 17, tries to wriggle the shutter outwards, the shutter can be provided with a small stop which in nonoperative position of the shutter projects upwardly in the hole 2a and thereby blocks any displacement. The wedge stop 7b then must be lowered a distance corresponding to the height of the locking stop, i.e. allow for some play.

The arrangement according to FIGS. 5–7, in which the shutter is movable in the direction of the connecting line of the holes, apparently is of special advantage with plugs of the flat pin type, where the pins face each other with their flat sides. In this case, with the construction shown, the shutter must be moved only a distance corresponding to the thickness of the pins, which allows for an extremely compact and reliable design.

What I claim is:

1. A bipolar electric socket comprising
a casing having a top portion and a bottom portion spaced therefrom and substantially parallel thereto, each having aligned openings therein,
spaced contact members within said casing below said bottom portion and aligned with said openings,
a fixed inclined guide surface in the space between said top and bottom portions, adjacent said openings, a shutter having a plane upper surface in sliding contact with the lower face of said top portion, said shutter spanning said openings and closing access to said contact members, means yieldably urging one end of said shutter into engagement with said inclined surface whereby said shutter is urged upwardly along said incline into tight engagement with the lower face of said top portion, and means locking said shutter against sliding movement with respect to said top portion until said shutter is depressed against said inclined surface in a position substantially parallel to the plane of said top portion, and whereby upon the insertion of the prongs of a male attachment plug into said openings, said shutter is depressed in a position substantially parallel to the plane of said top member sufficiently to release said shutter from said locking means, whereupon said shutter is urged against said inclined surface and moved against the force of said yieldable means to expose said contact members for connection with said attachment plug.

2. A socket according to claim 1 in which said inclined surface is integral with the casing.

3. A socket according to claim 1, in which said inclined surface has a width substantially less than that of said shutter and is placed substantially midway between the lateral edges of said shutter.

4. A socket according to claim 1 in which said locking means comprises interengaging means on said top portion of the casing and the adjacent meeting surface of said shutter.

5. A socket according to claim 4 in which said interengaging means comprises complementary notches and grooves on the respective marginal edge portions of said top ans shutter.

6. A socket according to claim 1 in which the yielding means comprises a spring.

7. A socket according to claim 1, wherein the bottom of the casing has a shoulder facing said inclined surface, with the bottom edge of said shutter opposite said surface resting against said shoulder when said openings are closed by said shutter, and wherein said shutter has a curved upper surface in extension of said plane surface, whereby upon the insertion of the prongs of a male attachment plug into said socket, said shutter will be caused; to rock about the juncture of said plane and curved surfaces, to lift its said bottom edge out of locking engagement with said shoulder, and to be moved down said inclined surface and rearwardly thereof.

8. A socket according to claim 1 wherein said shutter has an opening alignable with one of said top openings, and said casing has at least one stop member opposite said inclined surface holding said shutter in nonoperative position when said shutter opening is nonaligned with its corresponding top opening, and yieldable means urging said shutter into tight engagement with said top portion, whereby, upon insertion of the prongs of a male attachment plug into said top openings, said shutter is depressed and displaced from engagement with said stop member and is caused to move along said inclined surface to bring said shutter opening into alignment with its said corresponding top opening and expose said contact members for connection with the prongs of said plug.

9. A socket according to claim 8, wherein said inclined surface comprises separate inclined planes disposed at opposite sides within said casing and said shutter comprises a plane T-shaped member having the arms of the T resting on said inclined surfaces.

10. A socket according to claim 1 in which additional means is disposed between said shutter and said bottom portion to maintain said shutter in tight yielding abutment with said top portion.